(12) United States Patent
Peng et al.

(10) Patent No.: US 10,565,128 B2
(45) Date of Patent: *Feb. 18, 2020

(54) WORKLOAD DETECTION AND MEDIA CACHE MANAGEMENT

(71) Applicant: Seagate Technology LLC, Cupertino, CA (US)

(72) Inventors: CheeHou Peng, Singapore (SG); PohGuat Bay, Singapore (SG); HaiBo Ye, Singapore (SG); KayHee Tang, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,923

(22) Filed: Nov. 27, 2018

(65) Prior Publication Data

US 2019/0095348 A1 Mar. 28, 2019

Related U.S. Application Data

(63) Continuation of application No. 15/058,539, filed on Mar. 2, 2016, now Pat. No. 10,176,119.

(51) Int. Cl.
*G06F 12/00* (2006.01)
*G06F 12/126* (2016.01)

(52) U.S. Cl.
CPC ...... *G06F 12/126* (2013.01); *G06F 2212/455* (2013.01); *G06F 2212/464* (2013.01)

(58) Field of Classification Search
None
See application file for complete search history.

(56) References Cited

U.S. PATENT DOCUMENTS

| | | |
|---|---|---|
| 6,606,589 B1 | 8/2003 | Tuma et al. |
| 8,402,226 B1 | 3/2013 | Faibish et al. |
| 8,879,183 B1 | 11/2014 | Weikal |
| 8,922,930 B1 | 12/2014 | Weikal |
| 8,947,817 B1 | 2/2015 | Chung et al. |
| 9,047,923 B1 | 6/2015 | Lum et al. |
| 9,116,814 B1 | 8/2015 | Huang et al. |
| 2015/0301747 A1 | 10/2015 | Sokolov et al. |
| 2015/0324135 A1 | 11/2015 | Chan et al. |
| 2015/0347296 A1 | 12/2015 | Kotte et al. |
| 2016/0019156 A1 | 1/2016 | Feldman et al. |

FOREIGN PATENT DOCUMENTS

JP 2014182865 A 9/2014

*Primary Examiner* — Jason W Blust
(74) *Attorney, Agent, or Firm* — Holzer Patel Drennan

(57) ABSTRACT

Implementations disclosed herein include a method comprising detecting a workload request from a host, estimating a media cache fill-up rate based on the detected workload request, estimating a current media cache usage, predicting, based on the detected workload request, the estimated media cache fill-up rate and the estimated current media cache usage, a workload profile, and determining a preemptive media cache cleaning strategy based on the predicted workload profile.

20 Claims, 5 Drawing Sheets

| Workload Prediction Profiling | Workload detector | Resource detector |
|---|---|---|
| Massive Random Write Commands | Number of continuous host random write commands is greater than or equal to $X$. | Within each poll interval, MC node increment difference is equal to or greater than Nmrw. |
| Massive Random Read Commands | Number of continuous host random read commands is greater than or equal to $X$. | MC is below saturation level (e.g., MC segments percentage is less than SPmrr, MC nodes percentage is less than NPmrr). |
| Massive Random Read and Write Commands | A mixture of read and write commands, total $X$ write commands with interleave read commands within a range of not more than $Y$ continuous random read commands. | Within each poll interval, MC node increment is greater than or equal to Nmrw. |
| Repetitive or Sequential Write or Overlap Writes Commands | Repeated repetitive write access to the same LBA location for more than one time consecutively. Sequential write command does not satisfy streaming condition. Overlap write command with LBA does not satisfy streaming condition. | Within each poll interval, MC node is greater than or equal to Nrsow and MC node percentage level is greater than or equal to Nprsow, or MC segment is greater than or equal to Srsow and MC segment percentage level is greater than or equal to Sprsow. |

$Nmrw$ = MC Nodes incremented per interval (massive random write)(60 nodes/sec)

$SPmrr$ = MC Segments incremented per interval (massive random read) (80%)

$X$ = number of commands (256), $Y$ = number of consecutive random read commands (16)

$Nmrrw$ = MC Nodes incremented per interval (massive random read and write)(60 nodes/sec)

$Nrsow$ = MC Nodes incremented per interval (repetitive or sequential write or overlap writes) (30 nodes/sec)

$Srsow$ = MC Segments incremented per interval (repetitive or sequential write or overlap writes) (15 segments/sec)

$NPmrr$ = MC Nodes Percentage (massive random read) (85%)

$Nprsow$ = MC Nodes Percentage (repetitive or sequential write or overlap writes) (10%)

$Sprsow$ = MC Segments Percentage (repetitive or sequential write or overlap writes) (25%)

| Predicted Workload Profile | Preemptive Housekeeping Strategy |
|---|---|
| Massive Random Write Commands | _Aggressive Cleaning_<br>-Throttle each host command by delaying _Tmrw_ prior to process into the host command<br>-Start MC cleaning |
| Massive Random Read Commands | _Idle Cleaning_<br>- Start MC cleaning only when no host command received for 250ms (host idle) |
| Massive Mixture of Random Read and Write Commands | _Moderate Cleaning_<br>-Throttle each host write command by delaying _Tmrrw_ prior to processing the host command<br>-Read command will be processed as normal<br>-Defragment MC (Density BRO, Feed Forward BRO) |
| Repetitive or Sequential Write or Overlap Write Commands | _Conservative Cleaning_<br>-Start MC cleaning |

*Tmrw = throttle time per host command (massive random write) (16ms)

*Tmrrw = throttle time per host command (massive random read and write) (32ms)

FIG. 3

WORKLOAD DETECTION AND MEDIA CACHE MANAGEMENT

PRIORITY CLAIM

The present application is a continuation application of U.S. patent application Ser. No. 15/058,539 filed Mar. 2, 2016, and titled "Workload Detection and Media Cache Management", which is hereby incorporated by reference in its entirety.

BACKGROUND

Shingled magnetic recording allows for increased cell density, but generally entails re-writing an entire band of shingled data when one or more cells within the band are changed. As a back-up during the re-writing, the data is temporarily saved to a second, temporary memory (e.g., a media cache, etc.).

SUMMARY

In one implementation, the disclosed technology provides a method comprising detecting a workload request from a host, estimating a media cache fill-up rate based on the detected workload request, estimating a current media cache usage, predicting, based on the estimated media cache fill-up rate and the estimated current media cache usage, a workload profile, and determining a preemptive media cache cleaning strategy based on the predicted workload profile.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

FIG. 2 illustrates an example table for determining a predicted workload profile.

FIG. 3 illustrates an example table for determining a preemptive housekeeping strategy.

DETAILED DESCRIPTION

Figure 1:
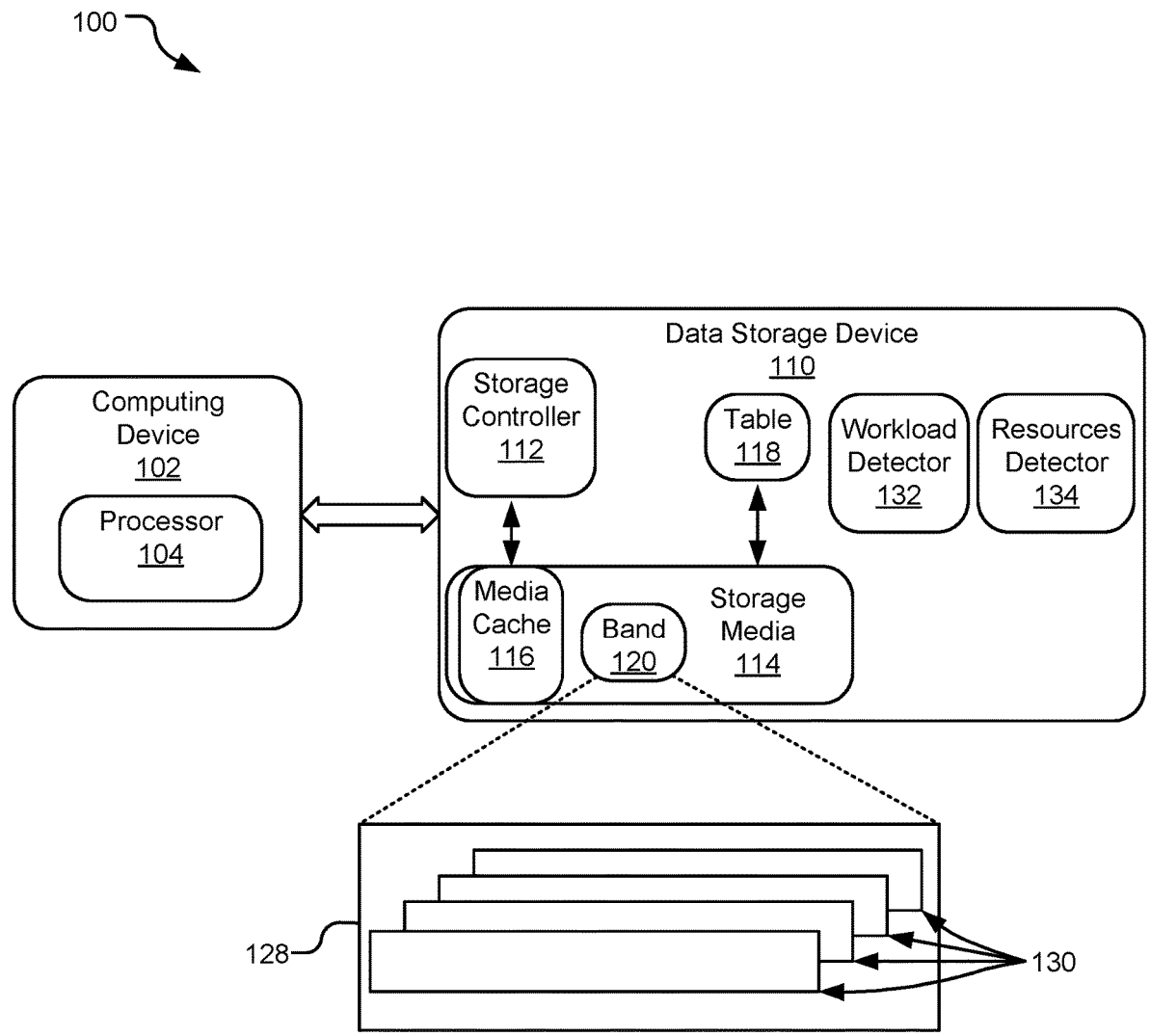
FIG. 1 illustrates a block diagram of an example data storage device system.

The present disclosure includes methods of predicting and preemptively managing a host workload request in a data storage system to reduce the risk of media cache saturation. Beside main data storage area (main store), some implementations of the data storage systems and devices use one or more of such plurality of data storage areas or locations for temporary storage of data. Such temporary storage areas may include media cache, etc. A storage controller of such data storage systems may be used for a variety of purposes, including storing data in a media cache or a buffer in response to write commands received from a host or computing device, storing data in the media cache for a rewrite operation, storing data in the media cache for write operation optimization purposes, etc.

In non-shingled magnetic media, each of the cells on a magnetized medium are of a sufficiently larger size relative to the size of the write pole to allow the write pole to write data to the cells without overwriting data in any surrounding cells. As a result, data may be written to available cells anywhere on the magnetic medium. However, as requirements for data storage density increase for magnetic media, cell sizes decreases. A commensurate decrease in the size of the write pole is difficult because a strong write field gradient provided by a larger write pole is often required to shift the polarity of the cells on the magnetized medium. As a result, writing data to smaller cells on the magnetized medium using the relatively larger write pole may affect the polarization of adjacent cells (i.e., overwriting the adjacent cells). One technique for adapting the magnetic medium to utilize smaller cells while preventing adjacent data being overwritten during a write operation is shingled magnetic recording (SMR).

In SMR, data recording density on a disk is increased by writing a track of data to partially overlap an adjacent data track, resulting in a "shingled" track structure. SMR utilizes a large strong write field generated by the write pole. One constraint of shingled magnetic recording is that when data is written to the magnetic media, it is written in sequentially increasing or decreasing radius tracks. The strong write field from the wide writer affects one or more adjacent tracks including the track being written to and one or more previously-written tracks located in down-track from the track being written to. As a result, in order to change any data cell within the shingled tracks, all of the data within the shingled tracks is re-written in the selected forward sequential write order.

When an SMR device receives a write command to write new data to a disk or a modify command to modify some existing data on a disk, the SMR device responds to the write and/or modify command(s) by reading and copying all of the data into a data band. The new material may be written, where such a data band may include a plurality of shingled data tracks located in a drive's main store.

For an SMR drive with static logical block address to physical block address mapping, random host data may be written to media cache sequentially for fast host response. In a background process, the host data will be consolidated and then moved to a drive's main store during the media cache cleaning process. The media cache cleaning may be achieved through a band update process. For example, an SMR band update process, such as one using a band rewrite operation (BRO), may be used to update a band(s). A BRO involves updating a band with a large fraction of sectors that have no new data, the addresses of which do not need to be accessed in any way.

The BRO operation may include a read step, wherein data is read from a band and stored into the buffer. Subsequently, during a modify step, new data is combined with the data stored in the buffer. A write step follows next, which involves writing the combined data from the buffer. The last write step occurs at a final resting place in the main store on the media wherein the data from the buffer is written to the SMR band. There may be numerous revolutions required for the average SMR data update process to update data on a band of SMR media. Each of such revolutions may encounter errors in reading data, writing data, etc. Also, the bigger the band size, the poorer the efficiency of media cache cleaning due to operation amplification. It is desirable to manage the SMR data update process to prevent the media cache from being saturated.

In the disclosed technology, methods and systems include detecting a workload request from a host. Based on the detected workload request, a media cache fill-up rate can be estimated. Specifically, the media cache fill-up rate provides the rate (per time) at which the media cache is being filled up. Such media cache fill-up rate may be determined to be high when the workload request includes a massive write commands, etc. One implementation also estimates the current media cache usage. For example, such current media cache usage may be in terms of the percentages of the media cache that is currently used, the number of sectors of the media cache that are currently used, etc. Based on the estimated media cache fill-up rate and estimated current media cache usage, a workload profile required to complete the detected workload request can be predicted. For example, workload profile may be determined to be a that of massive random write commands, etc. A preemptive media cache cleaning strategy can be determined. As a result, the disclosed technology reduces the risk of media cache saturation.

FIG. 1 illustrates a block diagram of an example data storage system 100, showing various functional components used to control the operation of a data storage device 110 (e.g., an SMR HDD, an SMR SSHD, an object storage device, etc.). The system 100 includes a computing device or host device 102 (e.g., a computer, a mobile device, the Internet, etc.) operably connected to the data storage device 110, each of the host device 102 and the data storage device 110 communicating with each other.

A processor 104 is located in the host device 102. The processor 104 sends one or more read or write commands to a storage device controller 112 for execution. As control communication paths are provided between a host device 102 and the storage device controller 112, the storage device controller 112 provides communication and control for the data storage device 110.

A storage media 114 located in the data storage device 110 may be one or more of a variety of tangible media (excluding carrier waves and communication signals), including hard disk drives and solid state hybrid drives, stores data on magnetic media, as well as optical media, solid state media such as NAND, NVRAM, Resistive RAM (ReRAM), Magnetic RAM (MRAM), Phase Change Memory (PCM), and other advanced and staid memory technologies.

The data storage device 110 further includes a non-volatile media cache 116 that is either a storage area on the storage media 114 or another non-volatile memory accessible by the data storage device 110. In the depicted system 100, the media cache 116 is a storage area on the storage media 114. In an implementation where the storage media 114 is configured to store data using SMR, the data may be stored on one of a plurality of bands, each band including a plurality of shingled tracks, such as a band 120 of shingled tracks located on the storage media 114. In an exploded view 128, a plurality of shingled tracks 130 located in the band 120 are shown. An implementation of the shingled tracks 130 is arranged such that when data is written to one of the shingled tracks 130 (except for the last data track), the writing operation affects data on an adjacent track in a down-track direction.

The data storage device 110 may write data to the storage media 114, and more specifically to one or more of the media cache 116 and the band 120. A table 118 may be located in the data storage device 110, wherein the workload profile can be mapped to preemptive cleaning or "housekeeping" strategies. Such workload profiles are utilized, as described in the disclosed methods and systems below, in order to more efficiently manage host workload tasks and to reduce the risk of media cache saturation.

In the disclosed technology, a host work request or command is communicated to the data storage device 110. A workload detector 132 detects the workload request and determined the type of the workload request. For example, the workload detector 132 can detect one of the following workload requests: 1) random write commands; 2) random read commands; 3) a combination of random read commands and random write commands, sequential write commands, overlap write commands, etc.

Based on the detected workload request, a resources detector 134 can estimate a media cache fill-up rate. Then, the resources detector 134 can estimate a current media cache usage. Based on the estimated media cache fill-up rate and the estimated current media cache usage, the storage controller 112 can predict a workload profile. Determining the workload profile may include a determination of whether each detected workload is moderate or massive (e.g., massive random write commands, massive random read commands, etc.). The storage controller 112 also determines a preemptive media cache cleaning strategy based on the predicted workload profile.

In some implementations, the storage controller 112 reviews the table 118 to determine the preemptive media cache cleaning strategy. For example, the table 118 can include various predicted workload profiles, based on estimated media cache fill-up rate (based on values computed from the workload detector 132) and estimated current media cache usage per a workload event from the resources detector 134, and correlate cleaning or "housekeeping" operations for each workload request (described in more detail in FIG. 2). As a result, massive host workload requests can be efficiently managed without reaching the maximum capacity of the media cache.

FIG. 2 illustrates an example table 200 for determining a predicted workload profile. As provided above, a host work request or command may be communicated to a data storage device. The workload detector detects the workload request. For example, the workload detector can detect one of the following workload requests: random write commands, random read commands, a combination of random read commands and random write commands, sequential write commands, overlap write commands, etc.

In one implementation, the workload detector may detect a number of continuous host random write commands that are, for example, greater than or equal to X commands (e.g., X=256). The resource detector polls a media cache (MC) node every one second. Within each poll interval, if media cache node increment per interval difference is greater than or equal to a threshold number of media random writes ("Nmrw"), the resource detector may predict a workload profile to include "massive" random write commands, as provided in the table 200. As will be described in more detail in FIG. 3, a predicted workload profile for massive random write commands may correlate with a housekeeping operation in the media cache that includes aggressive cleaning. An aggressive cleaning may comprise throttling each host command by a "Tmrw" (throttle time per host massive random write command), prior to processing the host command and start media cache cleaning thereafter. For example, the Tmrw may be 16 ms.

In another implementation, the workload detector may detect a number of continuous host random read commands that are, for example, greater than or equal to X commands (e.g., X=256). The resource detector may determine that as long as the media cache is below a saturation percentage level of massive random reads ("SPmrr"), the resource detector may predict a workload profile for "massive" random read commands, as provided in the table 200. For example, if the percentage of media cache segments is less than SPmrr (e.g., 80%) and the percentage of media cache nodes is less than "NPmrr" (e.g., 85%). As will be described in more detail in FIG. 3, a predicted workload profile for massive random write commands may correlate with a housekeeping operation in the media cache that includes idle cleaning (e.g., start media cache cleaning only when no host command is received for 250 ms (host idle)).

In another implementation, the workload detector may detect a combination of continuous host random read commands and random write commands. For example, the workload detector may detect a total of "X" write commands, with interleaved read commands in between the write commands, within a tolerable range of not more than "Y" continuous random read commands. For example, X=number of write commands (e.g., 256) and Y=number of continuous random read commands (e.g., 16)).

The resource detector may poll the media cache node every one second. Within each poll interval, if the media cache node increment per interval is greater than or equal to "Nmrrw" (e.g., 60 nodes/sec), the resource detector may predict a workload profile to be "massive" random read and write commands, as provided in the table 200. As will be described in more detail in FIG. 3, a predicted workload profile for massive random read and write (Nmrrw) commands may correlate with a housekeeping operation in the media cache that includes moderate cleaning. A moderate cleaning may include, for example, throttling each host write command by a "Tmrrw" (throttle time per host massive random read and write command), prior to processing the host write command, while host read command is not delayed and start defragmenting multiple media cache nodes and segments within the same LBA range into one single nodes. For example, the Tmrrw may be 32 ms.

In another implementation, the workload detector may either detect a sequential write commands that do not satisfy a write streaming condition or overlapped repetitive write commands. To satisfy a write streaming condition, sequential write size needs to be greater than 2 shingled tracks of media (e.g, for a Rosewood 2.5" drive, two shingled tracks is ~3.2 Mbytes data size). Overlapped repetitive write commands may be incremental LBA (forward) or decremented LBA (backward), and write commands may have an overlap LBA range, but could never satisfy a streaming condition. The resource detector may poll a media cache node and a media cache segment for every one second. Within each poll interval, if a media cache node increases more than "Nrsow" (media cache nodes incremented per interval streaming condition or overlapped repetitive write commands, e.g. 30 nodes/sec), and the media cache node percentage level is greater than or equal to NPrsow (e.g., 10%), or a media cache segment increases more than Srsow (media cache segments incremented per interval streaming condition or overlapped repetitive write commands, e.g. 15 segments/sec) and the percentage of media cache segments are equal or greater than SPrsow (e.g., 25%), the resource detector may predict a workload profile for streaming condition or overlapped repetitive write commands, as provided in the table 200. As will be described in more detail in FIG. 3, a predicted workload profile for streaming condition or overlapped repetitive write commands may correlate with a housekeeping operation in the media cache that includes conservative cleaning (start media cache cleaning).

Depending on an implementation, the values for X, Y, Nmrw, Nmrrw, Nrsow, Srsow, NPmrr, NPrsow, SPmrr, SPrsow, etc. can change and be tailored to specific products used. The examples provided above are provided for demonstrative purposes.

FIG. 3 illustrates an example table 300 for determining a preemptive housekeeping strategy. As provided above, in the disclosed technology, a host work request is communicated to a data storage device. A workload detector detects the workload request (e.g., random write commands, random read commands, a combination of random read commands and random write commands, repetitive or sequential write commands, overlap write commands, etc.).

A resources detector estimates a media cache fill-up rate based on the detected workload request. Then, the resources detector estimates a current media cache usage. Based on the estimated media cache fill-up rate and the estimated current media cache usage, the resources detector can determine whether the detected workload is massive or moderate and compiles that data into a table to predict a workload profile. The predicted workload profile in the table 300 tabulates to specific preemptive media cache cleaning or "housekeeping" operations for each workload request.

Four different example scenarios are provided in the table in FIG. 3. A predicted workload profile for massive random write commands may correlate with a housekeeping operation in the media cache that includes aggressive cleaning from beginning to end. In some implementations, aggressive cleaning can mean to throttle each host command, by delaying Tmrw prior to processing the host command (Tmrw=16 ms), and start cleaning thereafter. In alternative implementations, the Tmrw may be set at some alternate predetermined time.

A predicted workload profile for massive random read commands may correlate with a housekeeping operation in the media cache that includes cleaning during idle. In some implementations, idle cleaning can mean starting media cache cleaning only when no host command is received for 250 ms (host idle). Alternatively, idle cleaning may include starting media cache cleaning when no host command is received for some alternate predetermined time period.

A predicted workload profile for a massive combination of random read commands and random write commands may correlate with a housekeeping operation in the media cache that includes moderate cleaning. A moderate cleaning may include, for example, throttling each host write command by a "Tmrrw" (throttle time per host massive random read and write command), prior to processing the host write command, while host read command is not delayed and start defragmenting multiple media cache nodes and segments within the same LBA range into one single nodes. For example, the Tmrrw may be 32 ms.

And lastly, a predicted workload profile for repetitive or sequential write commands or overlap write commands may correlate with a housekeeping operation in the media cache that includes conservative cleaning. In some implementations, conservative cleaning can mean to start media cache cleaning without any throttling. As a result, massive host workload requests can be efficiently managed without reaching the maximum capacity of the media cache.

Depending on an implementation, the values for Tmrw, Tmrrw, etc. can change and be tailored to specific products used. The examples provided above are provided for demonstrative purposes.

Figure 4:
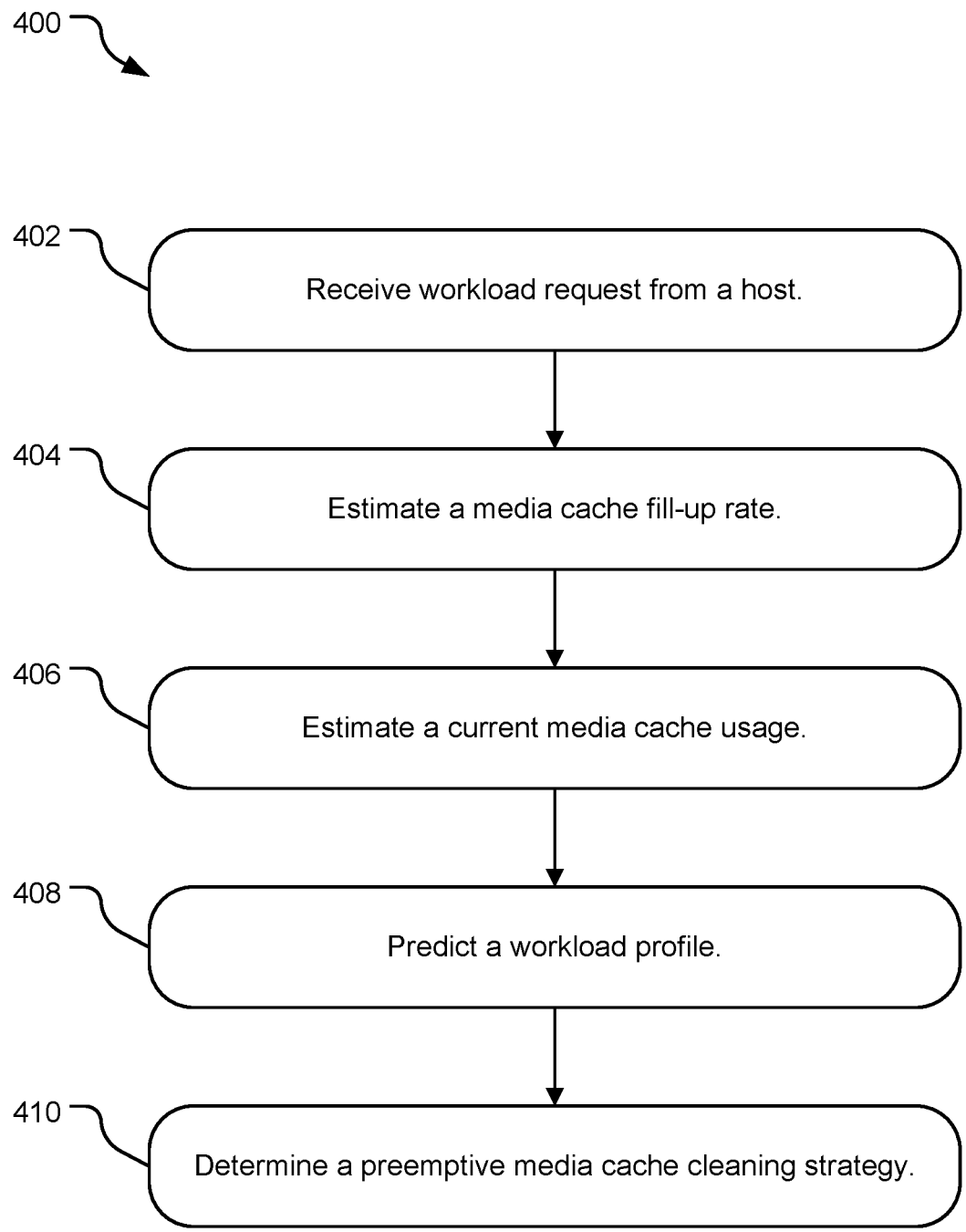
FIG. 4 illustrates a flowchart of example operations for determining preemptive media cache cleaning strategies.

FIG. 4 illustrates a flowchart of example operations 400 for determining preemptive media cache cleaning strategies. A detecting operation 402 detects a workload request from a host. For example, the workload detector can detect one of the following workload requests: 1) random write commands; 2) random read commands; 3) a combination of random read commands and random write commands, sequential write commands, overlap write commands, etc. When the workload detector detects the workload request, it can compute the commands, and adjust the computed incoming command for the resource detector to use in predicting a workload profile.

An estimating operation 404 estimates a media cache fill-up rate based on the detected workload request. Specifically, the resource detector can estimate the media cache fill-up rate. An estimating operation 406 estimates a current media cache usage. Specifically, the resource detector can estimate the current media cache usage.

A predicting operation 408 predicts, based on the estimated media cache fill-up rate and estimated current media cache usage, as well as data from the workload detector, a workload profile. This can include a determination by the resource detector of whether each detected workload is moderate or massive (e.g., massive random write commands, massive random read commands, etc.).

A determining operation 410 determines a preemptive media cache cleaning strategy based on the predicted workload profile. In some implementations, the storage controller reviews a table to determine the preemptive media cache cleaning strategy (e.g., aggressive cleaning, idle cleaning, moderate cleaning, conservative cleaning, etc.). For example, the table can include various predicted workload profiles, based on values computed from the workload detector and estimated media cache fill-up rate and estimated current media cache usage per a workload event from the resources detector, and correlate cleaning or "housekeeping" operations for each workload request. As a result, massive host workload requests can be efficiently managed without reaching the maximum capacity of the media cache.

Figure 5:
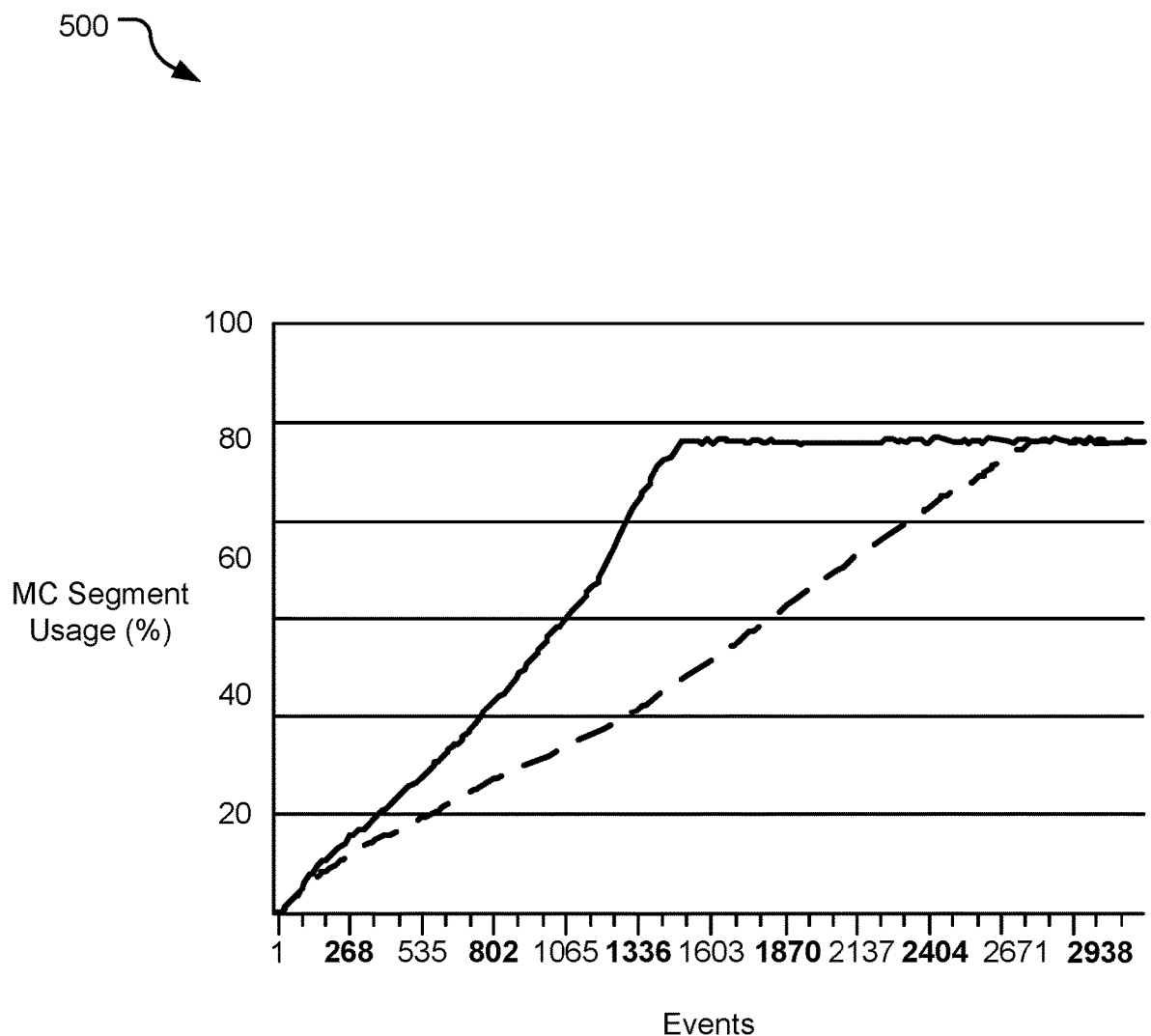
FIG. 5 illustrates a graph measuring a percentage of media cache usage vs. workload request events utilizing the methods of the disclosed technology.

FIG. 5 illustrates a graph 500 measuring a percentage of media cache segment usage vs. workload request events utilizing the methods of utilizing the preemptive media cache cleaning strategies of the disclosed technology. A percentage of media cache usage is shown on the y-axis. Individual workload events are shown in the x-axis. The graph shows that over time, and as more workload events occur, less of the media cache is used in an SMR system that includes the disclosed technology (shown in a dotted line, where the resource saturation rate gradually increases). An SMR system that does not include the disclosed technology (shown in the solid line) reaches approximately 80% capacity of the media cache in half the time of events.

The graph 500 shows that the disclosed methods mitigate the potential media cache saturation problems without impacting system performance. Additionally, the disclosed methods control and adjust host workload vs. a media cache housekeeping input/output (I/O) ratio. Therefore, by managing workload requests, such as BRO, at the right time, the disclosed technology allows more host cache hits, improves I/O, and reduces the risk of introducing BRO at a wrong time, thereby reducing a cache miss.

In addition to methods and systems, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A method comprising:
   estimating a media cache fill-up rate based on a workload request from a host;
   predicting, based on the estimated media cache fill-up rate and estimated current media cache usage, a workload profile to include massive random write commands;
   determining a preemptive media cache cleaning strategy responsive to the predicted workload profile to include a media cache cleaning based on predicting that the workload profile includes massive random write commands;
   throttling each host write command by a predetermined throttle time period prior to processing each host write command; and
   performing media cache cleaning following throttling each host write command.

2. The method of claim 1, further comprising:
determining the workload request includes random write commands responsive to detecting a number of continuous host random write commands meets a first predetermined threshold; and
determining the random write commands are massive random write commands responsive to detecting a media cache node increment difference within a poll interval meets a second predetermined threshold.

3. The method of claim 1, further comprising:
determining a workload request includes random read commands responsive to detecting a number of continuous host random read commands meets a first predetermined threshold; and
determining the random read commands are massive random read commands responsive to detecting the media cache is below a predetermined saturation level.

4. The method of claim 1, further comprising:
determining a workload request includes a combination of random read commands and random write commands responsive to detecting a number of the random write commands with interleave read commands in relation to a number of the random write commands is below a first predetermined threshold level; and
determining the combination of random read commands and random write commands are massive random read commands and massive random write commands responsive to detecting a media cache node increment difference within a poll interval meets a second predetermined threshold.

5. The method of claim 1, further comprising:
determining the workload request includes sequential write commands responsive to detecting the sequential write commands do not meet a predetermined streaming threshold.

6. The method of claim 1, further comprising:
determining the workload request includes overlap write commands responsive to detecting the overlap write commands do not meet a predetermined streaming threshold.

7. The method of claim 1, further comprising:
determining the preemptive media cache cleaning strategy includes idle cleaning responsive to determining the predicted workload profile includes massive random read commands; and
performing idle media cache cleaning when no host command is received for 250 ms.

8. The method of claim 1, further comprising:
determining the preemptive media cache cleaning strategy includes conservative cleaning responsive to determining the predicted workload profile includes one of repetitive write commands, sequential write commands, and overlap write commands; and
performing conservative media cache cleaning.

9. The method of claim 1, further comprising:
determining the preemptive media cache cleaning strategy includes moderate cleaning responsive to determining the predicted workload profile includes a combination of random read commands and random write commands;
throttling each host write command by a predetermined throttle time period prior to processing each host write command;
processing a read command; and
defragmenting the media cache.

10. A system comprising:
a storage media; and
a storage controller to:
predict, based on estimated media cache fill-up rate and estimated current media cache usage, a workload profile;
determine a preemptive media cache cleaning strategy based on the predicted workload profile to include one of an aggressive cleaning based on the predicted workload profile to include massive random write commands;
throttle each host write command by a predetermined throttle time period prior to processing each host write command; and
perform media cache cleaning following throttling each host write command.

11. The system of claim 10, wherein the workload request is one of includes random write commands determined responsive to detecting a number of continuous host random write commands meets a first predetermined threshold; and massive random write commands determined responsive to detecting a media cache node increment difference within a poll interval meets a second predetermined threshold.

12. The system of claim 10, wherein the preemptive media cache cleaning strategy includes conservative cleaning, responsive to determining the predicted workload profile includes one of repetitive write commands, sequential write commands, and overlap write commands.

13. The system of claim 10, further comprising a table to correlate the predicted workload profile with the preemptive media cache cleaning strategy.

14. One or more non-transitory computer-readable storage media encoding computer-executable instructions for executing on a computer system a computer process that reads only used shingled data tracks adjacent to a target track location, the computer process comprising:
estimating a media cache fill-up rate based on a workload request from a host;
predicting, based on the estimated media cache fill-up rate and estimated current media cache usage, a workload profile to include massive random write commands;
determining a preemptive media cache cleaning strategy responsive to the predicted workload profile to include one of a cleaning based on the predicted workload profile to include massive random write commands;
throttling each host write command by a predetermined throttle time period prior to processing each host write command; and
performing media cache cleaning following throttling each host write command.

15. The one or more non-transitory computer-readable storage media of claim 14, wherein the preemptive media cache cleaning strategy further comprises:
determining the workload request to be a massive combination of random read and write (mrrw) commands; and
throttling each host command by a predetermined throttle time period prior to each host command via a moderate cleaning strategy.

16. The one or more non-transitory computer-readable storage media of claim 15,
wherein the predetermined throttle time period is substantially equal to 32 ms.

17. The one or more non-transitory computer-readable storage media of claim 16,
wherein the preemptive media cache cleaning strategy further comprising:
determining the workload request to be a massive random write command; and delaying each host write command by a predetermined throttle time period prior to processing each host write command via an aggressive cleaning strategy.

18. The one or more non-transitory computer-readable storage media of claim 17, wherein the predetermined throttle time period is substantially equal to 16 ms.

19. The system of claim 10, wherein the predicted workload profile is further based on a measurement of media cache node increment per a predetermined time interval by the resource detector.

20. The system of claim 10, wherein the preemptive media cache cleaning strategy includes moderate cleaning responsive to determining the predicted workload profile includes a combination of random read commands and random write commands.

\* \* \* \* \*